United States Patent [19]
Lee

[11] Patent Number: 6,065,124
[45] Date of Patent: May 16, 2000

[54] COMPUTER SYSTEM HAVING POWER SAVING AND MANAGEMENT FUNCTION AND METHOD OF CONTROLLING THE SAME

[75] Inventor: Byung-Lae Lee, Kyunggi-do, Rep. of Korea

[73] Assignee: SamSung Electronics Co., Ltd., Kyungki-do, Rep. of Korea

[21] Appl. No.: 09/039,624

[22] Filed: Mar. 16, 1998

[30] Foreign Application Priority Data

Mar. 15, 1997 [KR] Rep. of Korea ......................... 97-8838

[51] Int. Cl.⁷ ....................................... G06F 1/32
[52] U.S. Cl. ............................ 713/323; 365/226
[58] Field of Search ..................... 365/222, 226; 713/320, 323, 324

[56] References Cited

U.S. PATENT DOCUMENTS

| | | | |
|---|---|---|---|
| 5,365,487 | 11/1994 | Patel et al. ............................... | 365/226 |
| 5,390,350 | 2/1995 | Chung et al. . | |
| 5,396,443 | 3/1995 | Mese et al. . | |
| 5,404,546 | 4/1995 | Stewart . | |
| 5,410,711 | 4/1995 | Stewart . | |
| 5,410,713 | 4/1995 | White et al. . | |
| 5,473,572 | 12/1995 | Margeson, III . | |
| 5,524,248 | 6/1996 | Parks et al. . | |
| 5,524,249 | 6/1996 | Suboh . | |
| 5,530,879 | 6/1996 | Crump et al. . | |
| 5,560,023 | 9/1996 | Crump et al. . | |
| 5,586,333 | 12/1996 | Choi et al. . | |
| 5,590,082 | 12/1996 | Abe ......................................... | 365/222 |
| 5,615,328 | 3/1997 | Hadderman et al. . | |
| 5,619,729 | 4/1997 | Bland et al. . | |
| 5,630,052 | 5/1997 | Shah . | |
| 5,634,106 | 5/1997 | Yaezawa et al. ....................... | 713/323 |
| 5,638,541 | 6/1997 | Sadashivaiah .......................... | 713/323 |
| 5,659,762 | 8/1997 | Sawada et al. . | |
| 5,680,334 | 10/1997 | Silva et al. . | |
| 5,682,273 | 10/1997 | Hetzler . | |
| 5,692,202 | 11/1997 | Kardach et al. . | |
| 5,696,977 | 12/1997 | Wells et al. . | |
| 5,710,931 | 1/1998 | Nakamura et al. . | |
| 5,721,935 | 2/1998 | DeSchepper et al. . | |
| 5,805,910 | 9/1998 | Lee et al. ................................ | 713/323 |
| 5,867,438 | 2/1999 | Nomura et al. ........................ | 365/222 |
| 5,925,132 | 7/1999 | Kadokura ............................... | 713/323 |
| 5,944,828 | 8/1999 | Matsuoka ................................ | 713/323 |

*Primary Examiner*—Glenn A. Auve
*Attorney, Agent, or Firm*—Robert E. Bushnell, Esq.

[57] ABSTRACT

An apparatus and method for controlling power management enable a computer system to have minimum power consumption during a rest mode. The power management system in the computer system allows the contents of the main memory to be maintained when the system proceeds to the rest mode. The apparatus includes a microcontroller which receives a first operating voltage from the power supply and controls power distribution based on the power management program stored in a BIOS ROM. The microcontroller generates a control signal when the system proceeds to the rest mode. Further included are: a main memory receiving a second operating voltage from the power supply and having a self-refresh function in the rest mode; a memory controller receiving a third operating voltage from the power supply and generating memory control signals supplied to the main memory; and a buffer receiving a second operating voltage from the power supply and located between the main memory and the memory controller for interrupting memory control signal lines in response to a control signal generated by the microcontroller. The microcontroller interrupts the third operating voltage when the buffer is inactivated by the control signal from the microcontroller.

19 Claims, 5 Drawing Sheets

COMPUTER SYSTEM HAVING POWER SAVING AND MANAGEMENT FUNCTION AND METHOD OF CONTROLLING THE SAME

CLAIM OF PRIORITY

This application makes reference to, incorporates the same herein, and claims all benefits accruing under 35 U.S.C. § 119 from an application entitled *a Computer System Having Power Saving and Management Function and a Method of Controlling the Same* earlier filed in the Korean Industrial Property Office on Mar. 15, 1997, and there duly assigned Ser. No. 97-8838 by that Office.

BACKGROUND OF THE INVENTION

1. Technical Field

The present invention relates to power saving and power management of computer systems, and more particularly to an apparatus and method for controlling power management such that the computer system has minimum power consumption during the "rest mode" of the system.

2. Related Art

Personal computer systems usually adopt a power saving and power management system as provided in Advanced Power Management (APM) jointly developed by Intel (r) and Microsoft (r). The purpose of power management is to reduce power consumed in personal computers. In particular, as to portable computers powered by a battery, it maximizes available battery usage time. Basically, it automatically reduces the power consumption of parts of the computer currently not in use. The power management system provides various power saving functions with the lapse of time set by the carbon metal oxide semiconductor (CMOS) setup program, and manages the progress of power saving between full-on, doze, standby, and rest mode. The rest mode is the level of least power consumption, which interrupts power supplies directed to microprocessor, display apparatus, hard disk drives, floppy disk drives, and other subsystems. The only power supplied is that which can restore the system to the full-on state. Further, the rest mode may urge the system to enter into full power-off state, if the power management system adopts a suspend-to-disk utility. This suspend-to-disk utility saves the contents of the main memory and the system information to a reserved space on the hard disk and proceeds to the system power off. Optionally, the suspend-to-disk utility can be operated in a suspend-to-RAM mode which saves the contents of the memory and the information to the main memory itself.

As explained in more detail below, current power management systems suffer from a substantial drawback in that electrical separation of the dynamic random access memory (DRAM) from other parts of the system controller is not easily achieved by design of the system.

Therefore, there is a need for the development of a power management system which supports a power down mode while overcoming the latter and other drawbacks of current system.

The following patents are considered to be representative of the prior power management system but are burdened by the disadvantage as discussed herein:

U.S. Pat. No. 5,721,935 issued to DeSchepper et al., entitled *an Apparatus and Method for Entering Low Power Mode in a Computer System;* U.S. Pat. No. 5,710,931 issued to Nakamura et al., entitled *a Suspension State Control for Information Processing Devices Such as Battery Powered Computers;* U.S. Pat. No. 5,696,977 issued to Wells et al., entitled *a Power Management System for Components Used in Battery Powered Applications;* U.S. Pat. No. 5,692,202 issued to Kardach et al., entitled *a System, Apparatus and Method for Managing Power in a Computer System;* U.S. Pat. No. 5,682,273 issued to Hetzler, entitled *a Disk Drive for Portable Computer with Adaptive Demand-driven Power Management;* U.S. Pat. No. 5,680,334 issued to Silva et al., entitled *a Hand-held Data Collection Computer Terminal Having Power Management Architecture Including Switchable Multipurpose Input Display Screen;* U.S. Pat. No. 5,659,762 issued to Sawada et al., entitled *a Method and Device for Rapidly Restarting a Computer System Expansion Device from a Power Save Mode;* U.S. Pat. No. 5,630,052 issued to Shah, entitled *a System Development and Debug Tools for Power Management Functions in a Computer System;* U.S. Pat. No. 5,619,729 issued to Bland et al., entitled *a Power Management of DMA Slaves with DMA Traps;* U.S. Pat. No. 5,615,328 issued to Hadderman et al., entitled *a PCMCIA SRAM Card Function Using DRAM Technology;* U.S. Pat. No. 5,586,333 issued to Choi et al., entitled *a Method and Control Apparatus for Generating Power Management Signal of Computer Peripheral Equipment in a Computer System;* U.S. Pat. No. 5,560,023 issued to Crump et al., entitled *an Automatic Backup System for Advanced Power Management,* U.S. Pat. No. 5,530,879 issued to Crump et al., entitled *a Computer System Having Power Management Processor for Switching Power Supply from One State to Another Responsive to a Closure of a Switch, a Detected Ring or an Expiration of a Timer;* U.S. Pat. No. 5,524,249 issued to Suboh, entitled *a Video Subsystem Power Management Apparatus and Method;* U.S. Pat. No. 5,524,248 issued to Parks et al., entitled *a Random Access Memory Power Management System;* U.S. Pat. No. 5,473,572 issued to Margeson, III, entitled *a Power Saving System for a Memory Controller, U.S. Pat. No. 5,410,713* issued to White et al., entitled *a Power-Management System for a Computer,* U.S. Pat. No. 5,410,711 issued to Stewart, entitled *a Portable Computer with BIOS-Independent Power Management;* U.S. Pat. No. 5,404,546 issued to Stewart, entitled *a BIOS Independent Power Management for Portable Computer;* U.S. Pat. No. 5,396,443 issued to Mese et al., entitled *an Information Processing Apparatus Including Arrangements for Activation to and Deactivation from a Power-Saving State;* and U.S. Pat. No. 5,390,350 issued to Chung et al., entitled *an Integrated Circuit Chip Core Logic System Controller with Power Saving Features for a Microcomputer System.*

SUMMARY OF THE INVENTION

It is, therefore, an object of the invention to provide an apparatus for controlling power management system which minimizes power consumption during the power down state of the computer system.

It is further object of the invention to provide a method for controlling power management system which can minimize power consumption during the power down state of the computer system.

In accordance with one aspect of the present invention, there is disclosed a computer system provided with a power management system in which the contents of the main memory are maintained when the system proceeds to the rest mode of the power management system. The computer system comprises: a power supply converting powers from AC or battery into required system voltages; a microcontroller receiving a first operating voltage from the power supply and for controlling power distribution based on the power management program stored in a BIOS ROM, and for generating a control signal when the system proceeds to the rest mode; a main memory receiving a second operating voltage from the power supply and having a self-refresh function when operated at the rest mode; a memory controller receiving a third operating voltage from the power supply and generating memory control signals supplied with the main memory; and a buffer receiving a second operating voltage from the power supply and located between the main memory and the memory controller for interrupting memory control signal lines in response to a control signal fed from the microcontroller, wherein the microcontroller interrupts the third operating voltage when the buffer is inactivated by the control signal of the microcontroller.

In the preferred embodiment of the present invention, the main memory consists of a DRAM, and the memory controller is incorporated into a system controller chip set which receives the third operating voltage from the power supply.

In accordance with another aspect of the present invention, a method for controlling power management system is provided in the computer system as described above. The method comprises the steps of: determining whether the rest mode is initiated by detecting lapse of a preset time since the standby state, or very low battery level, or actuation of a special function key that allows the system to enter into the rest state; storing values of registers in each part of the computer into a main memory; initiating the main memory to operate in the self-refresh mode when it receives the CBR refresh signal and preset time has lapsed since final access thereto; inactivating the buffer in response to the control signal fed from the microcontroller; and interrupting supply of the third operating voltage.

Further, the self-refresh mode performed in the main memory comprises the steps of: determining whether the main memory has received a CAS-before-RAS refresh signal from the memory controller; determining whether the preset time has lapsed without an access to the memory since the reception of CAS-before-RAS refresh signal; and allowing the memory to enter into self-refresh operation if the preset time has lapsed.

According to the present invention, the power management control system is capable of providing a maximum power saving level when the computer system enters the rest mode supporting the suspend-to-RAM mode. The logic design of the chip set, including the memory controller, becomes simple and easy since power separation between the main memory and the memory controller can be made during the power down mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
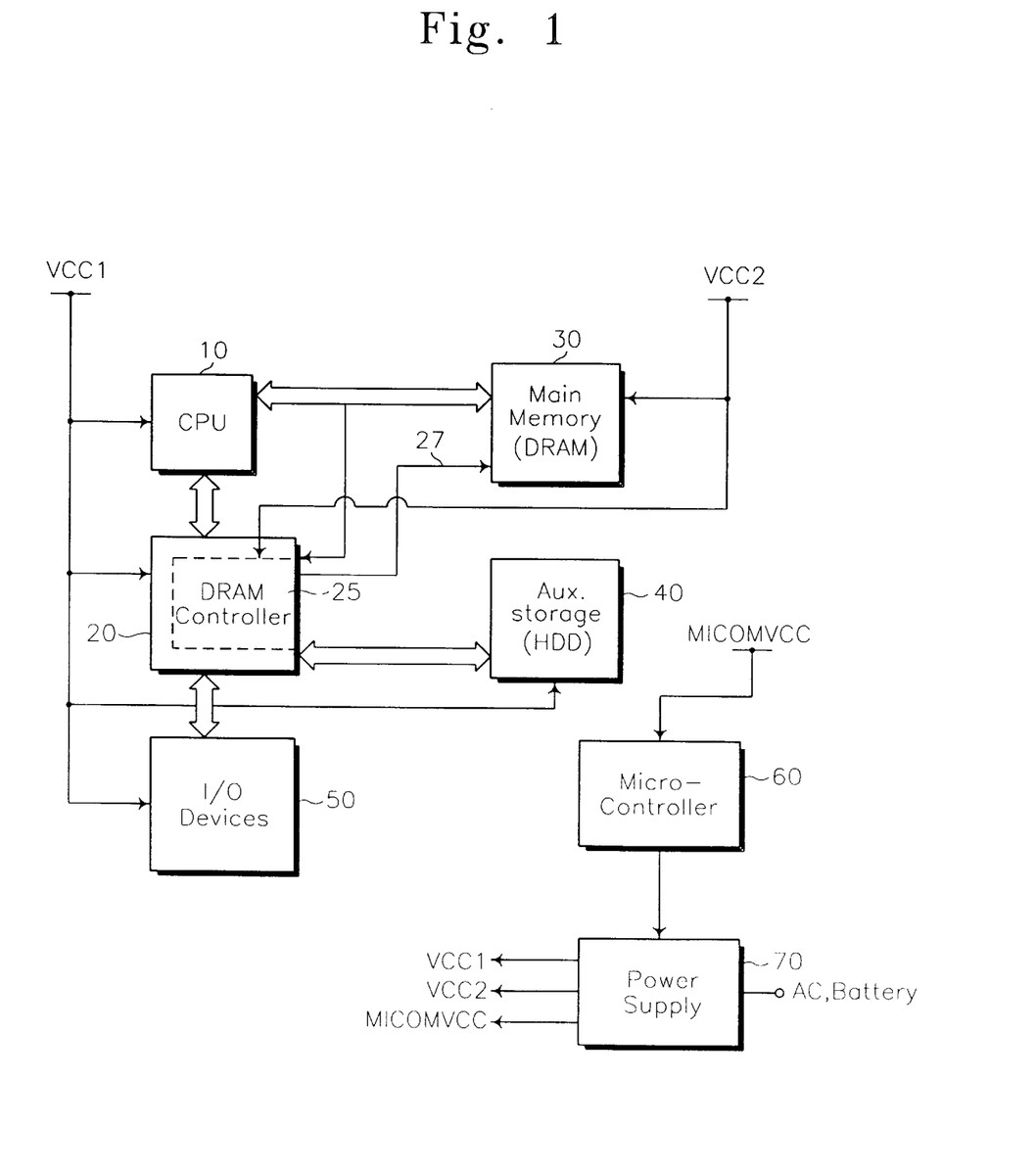
FIG. 1 is a block diagram of a personal computer system for carrying out power management function.

A power management system is shown in FIG. 1. There, a computer system includes a CPU 10, a system controller 20, a main memory 30, an auxiliary storage 40, and Input/Output devices 50, operably coupled to each other by a system bus. The computer system further includes a power supply 70 which supplies required operating voltages VCC1, VCC2, MICOMVCC to the parts of the computer, and a microcontroller 60 which controls power distribution of the power supply 70 according to the power management program stored in a basic input/output system read-only memory or BIOS ROM (not shown). The main memory 30 may consist of a dynamic random access memory or DRAM, and the system controller 20 includes the corresponding DRAM controller 25. The auxiliary storage 40 may consist of a hard disk drive (HDD).

In order to implement the suspend-to-RAM mode in the power management system of FIG. 1, power distribution has been made such that the power supplied to the main memory 30 and the DRAM controller 25 are set to the same operating voltage VCC2 and maintain that level during the suspend-to-RAM mode operation (hereinafter referred to "power down mode"). This allows the DRAM controller 25 to continuously operate and to refresh the DRAM device of the main memory 30 periodically via refresh signal lines 27 during the power down mode. Thus, it is possible to hold the data stored in the main memory 30 at the power down mode.

In this system, another operating voltage VCC1 is supplied to the CPU 10, the system controller 20, the HDD 40, and I/O devices 50. Since the system controller 20 incorporates the DRAM controller 25 in a semiconductor chip and the supplied power levels are different from one another, the DRAM controller 25 should be electrically separated from the other parts of the system controller 20. In the power down mode, supply of the voltage VCC1 is interrupted under control of the microcontroller 60. However, the power management system suffers from at least the following major drawbacks. Namely, it is difficult to design a system controller chip which enables the DRAM controller to be electrically separated. Although the system controller chip 20 is made to support the power down mode, power consumption occurs at the DRAM controller 25 to maintain active state and to generate refresh signals supplied with the main memory 30.

Based on the above, there presently exists a need in the art for a power management system supporting the power down mode which overcomes the drawbacks and shortcomings of the conventional power management system.

Figure 2:
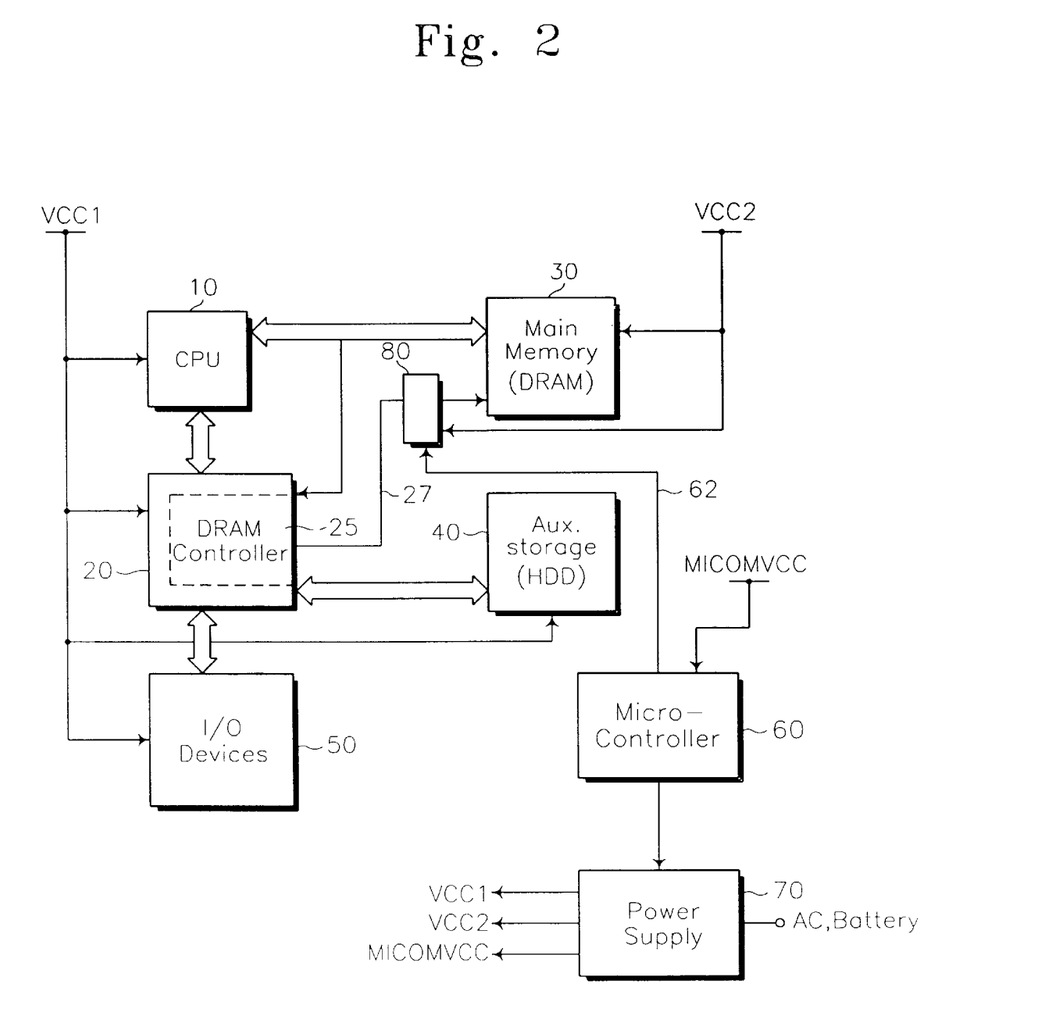
FIG. 2 is a block diagram of a personal computer system adopting a power management scheme in accordance with a first embodiment of the present invention.

Referring to FIG. 2, there is shown a personal computer system adopting a power management scheme in accordance with a first embodiment of the present invention. The computer system includes a CPU 10, a system controller 20, a main memory 30, an auxiliary storage 40, and Input/Output devices 50, operably coupled to each other by a system bus. The main memory 30 may consist of a DRAM having a self-refresh function, and the system controller 20 includes the corresponding DRAM controller 25. A buffer 80 is provided between the DRAM controller 25 and the main memory 30 for controlling transfer of the DRAM control signals to the main memory via the signal line 27. The auxiliary storage 40 may consist of a hard disk drive (HDD). The computer system further includes a power supply 70 which supplies required operating voltages to each part of the computer, and a microcontroller 60 which controls power distribution of the power supply 70 based on the power management program stored in a BIOS ROM (not shown), and which supplies a control signal to gates of the buffer 80.

The power distribution is configured such that the power supplied to the main memory 30 and the buffer 80 are set to the same operating voltage VCC2, and another operating voltage VCC1 is applied to the CPU 10, the system controller 20, the HDD 40, and I/O devices 50. An operating voltage MICOMVCC is continuously supplied to the microcontroller 60 from the power supply 70 when the system is powered by alternating current (AC) or a battery.

In the power down mode, the values of registers in each part are stored into the main memory 30 by the ROM BIOS program. The main memory 30 starts a self-refresh operation when a preset time has lapsed since final access thereto. The buffer 80 is inactivated by the control signal fed from the microcontroller 60. In this state, the DRAM control signal line 27 is cut off and the output of the buffer 80 maintains a high impedance state, which results in electrical separation between the DRAM controller 25 and the main memory 30. Finally, supply of the voltage VCC1 is interrupted under control of the microcontroller 60. Also, the power supplied to the DRAM controller 25 is interrupted. Only powers VCC2 supplied with the main memory 30 and buffer 80 is consumed to hold the data stored in the main memory. Thus, it is possible to save the power consumed in the DRAM controller 25 since the power is not supplied during the power down mode. Further, electrical separation between the main memory 30 and the DRAM controller 25, as well as the system controller 20, can be accomplished in a simple and easy manner.

Figure 3:
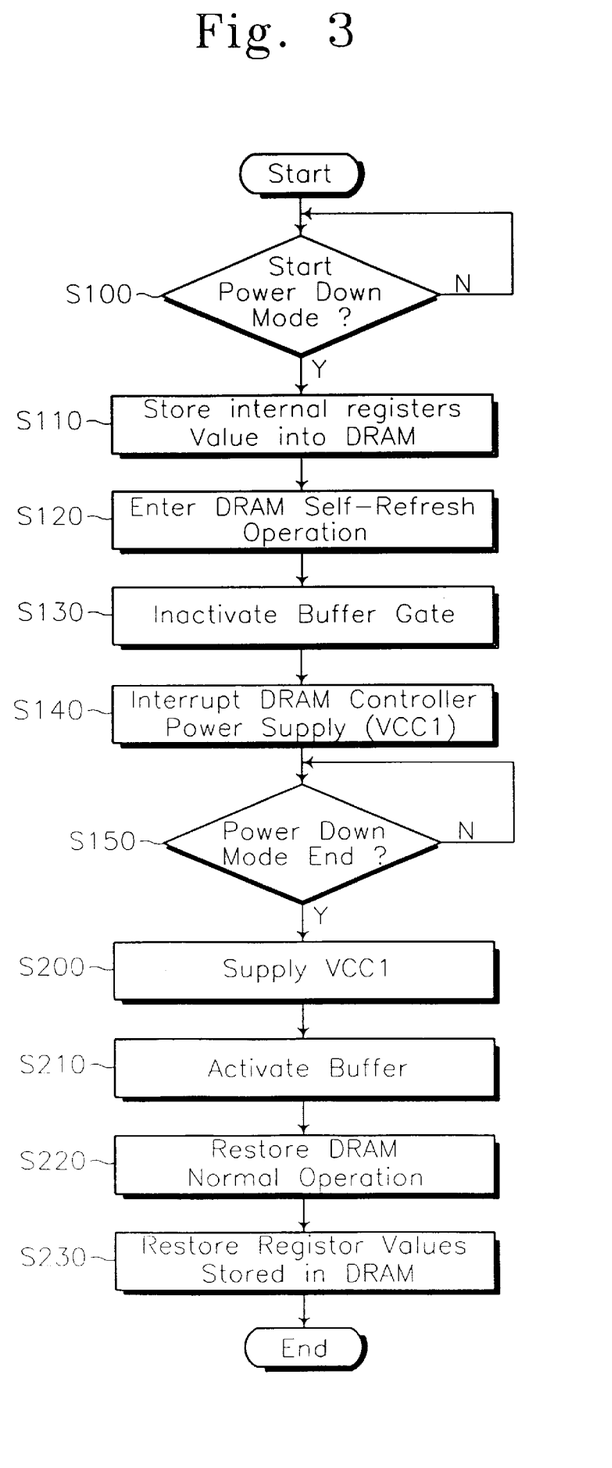
FIG. 3 is a flow chart showing a method of controlling power management operation of the computer in accordance with the first embodiment of the present invention.

FIG. 3 shows a method of controlling power management operation when the computer system enters the power down mode in accordance with the first embodiment of the present invention. The control of the power management system is performed by the ROM BIOS program. At step 100, a determination is made as to whether the power down mode is initiated. The power down mode can be started if the power management system proceeds to the rest mode after a lapse of a preset time since the standby state, or if the portable computer system has detected a very low battery level, or if system users actuate a special function key that allows the system to enter the rest mode. The rest mode operation is supported by the suspend-to-disk utility.

If the system detects the start of the power down mode, the values of registers in each part of the computer are stored in the main memory 30 at step 110. Subsequently, the main memory 30 starts a self-refresh operation at step 120 when it receives the CBR refresh signal and a preset time has lapsed since final access thereto. Next, at step 130, the buffer 80 is inactivated due to disabling of the control gate by the control signal fed from the microcontroller 60. In this state, the DRAM control signal line 27 is cut off and the output of the buffer 80 maintains a high impedance state, which results in electrical separation between the DRAM controller 25 and the main memory 30. Then, at step 140, the power VCC1 supplied to most of the computer system (that is, the CPU 10, the system controller 20, the HDD 40, and I/O devices 50) is interrupted under control of the microcontroller 60, and the power saving function can be performed.

When the system user presses the power switch of the computer, for example, the system detects the end of the power down mode, and starts to resume operation. More specifically, a determination is made, at step 150, as to whether the power down mode has ended. If the power down mode has ended, the system allows the microcontroller to supply voltage VCC1 at step 200 and to activate a gate of the buffer 80. This connects the DRAM control signal line 27 between DRAM controller 25 and main memory 30. Then, at step 220, the main memory 30 is restored to a normal operation mode and the stored register values in the main memory 30 are returned to their original location at step 230.

Figure 4:
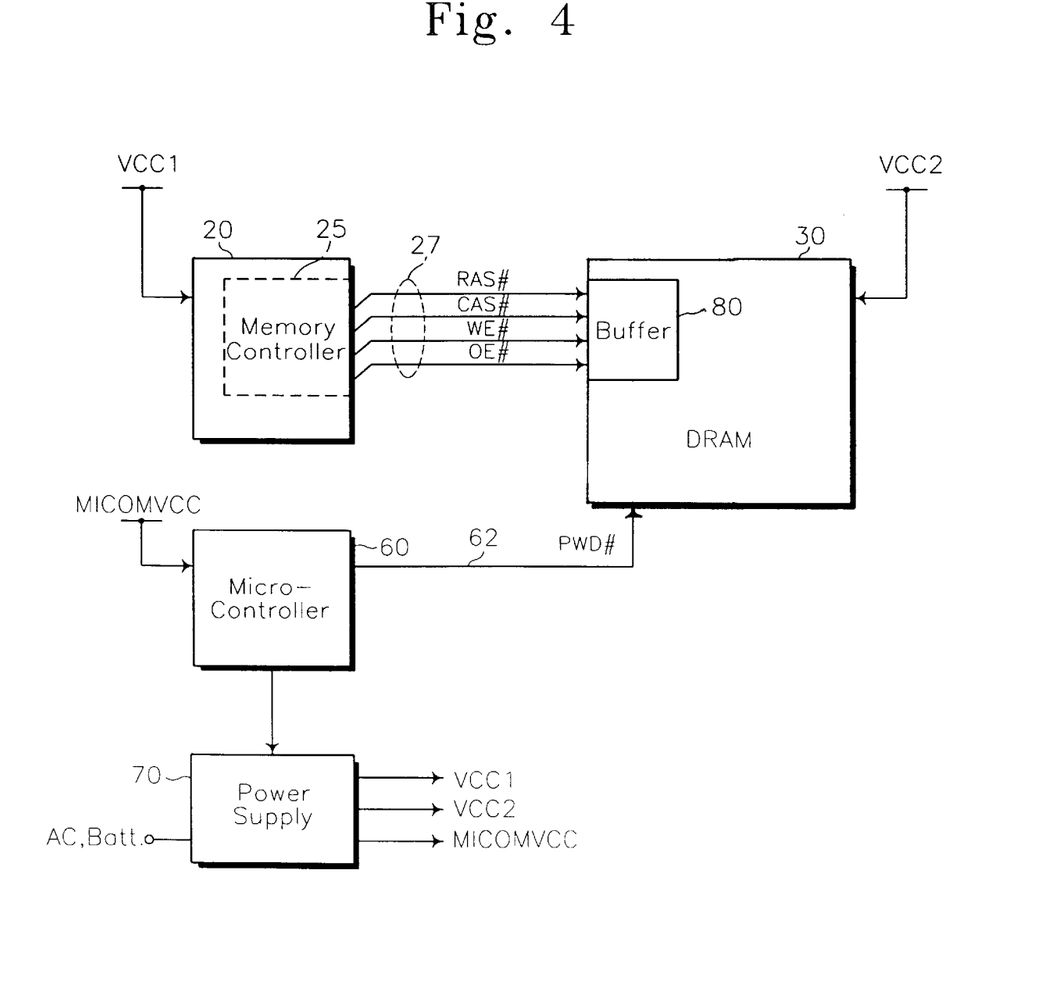
FIG. 4 is a detailed block diagram of a personal computer system adopting a power management system in accordance with a second embodiment of the present invention.

A detailed block diagram of the power management system in accordance with a second embodiment of the invention is shown in FIG. 4. The DRAM control signal lines 27 consist of RAS# signal, CAS# signal, WE# signal, and OE# signal lines provided by the DRAM controller 25. These control signal lines are connected to the DRAM of the main memory 30 via buffer 80. It should be noted that the buffer 80 is embedded in main memory 30, as shown in FIG. 4. This is in contrast to provision of buffer 80 separate from main memory 30 in FIG. 2. Buffer gates are connected to the power down PWD# signal line outputted from the microcontroller 60. When the PWD# control signal is issued from the microcontroller 60 in the power down mode, the buffer gates are disabled and the buffer 80 is inactivated. Thus, the control signal lines 27 are interrupted by the buffer 80. Before inactivation of the buffer, the system urges the DRAM 30 to enter the self-refresh mode.

Figure 5:
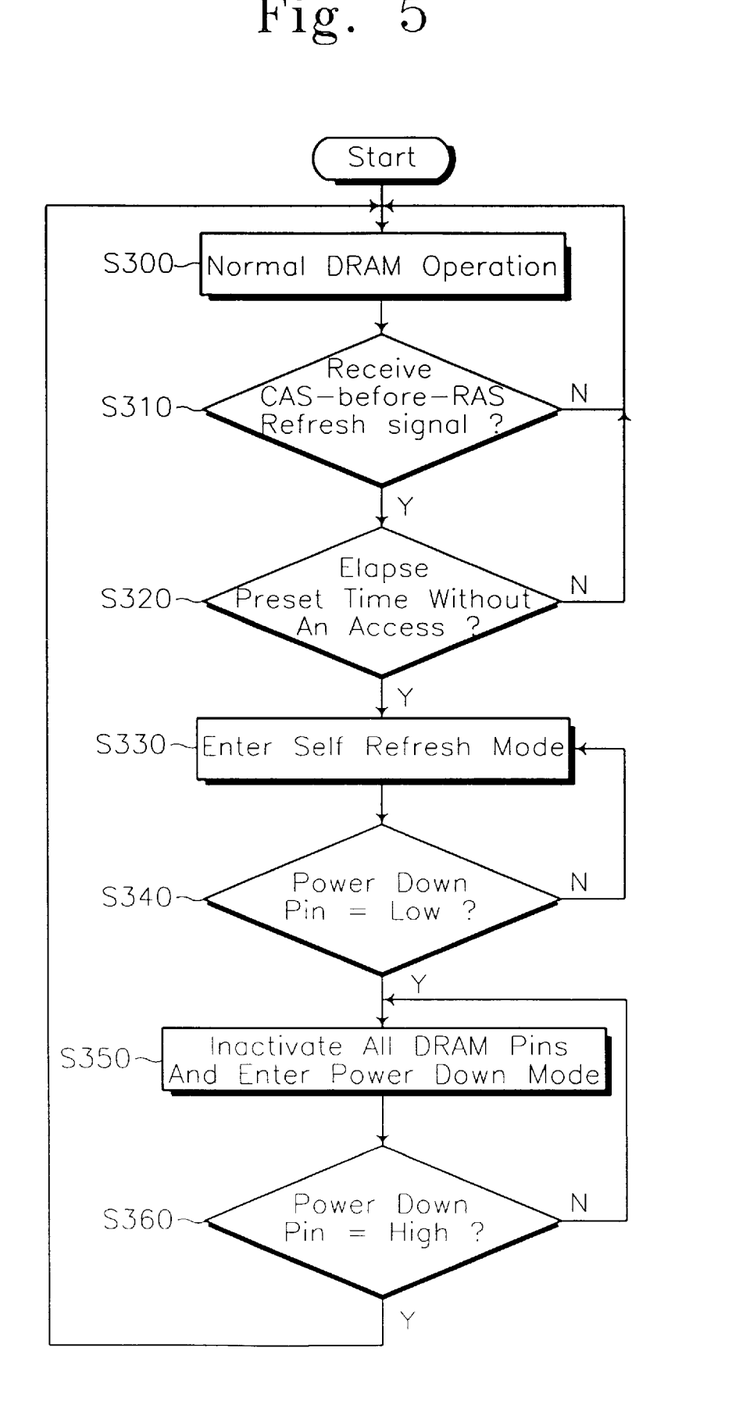
FIG. 5 is a flow chart showing a self-refresh operation of the main memory of FIG. 4.

FIG. 5 shows detailed operation of the self-refresh mode performed in the main memory 30. During the normal operation of the DRAM 30, at step 300, the main memory checks if it has received a CAS-before-RAS refresh signal from the DRAM controller 25 at step 310. Then, a further determination is made, at step 320, as to whether a preset time has lapsed without an access to the memory since the reception of CAS-before-RAS refresh signal. If the preset time has lapsed, the memory 30 enters into a self-refresh operation at step 330. During the self-refresh operation, the memory checks if the PWD# control signal is received from the microcontroller 60. The PWD# control signal can be detected through the buffer 80. If the PWD# control signal has changed to a low level at step 340, all DRAM pins of the main memory 30 are inactivated and assume a high impedance state. Thus, the main memory 30 can enter into a power down state at step 350. Moreover, if the system has returned to full power on state and the PWD# control signal is changed to high level at step 360, the main memory returns to normal operation (step 300).

As is apparent from foregoing, the power management control system of the present invention provides for a maximum power saving level when the computer system enters the power down mode. In particular, the logic design of the chip set, including the DRAM controller, becomes simple and easy since power separation between the main memory and the memory controller can be accomplished during the power down mode. Further, according to the present invention, when the computer system returns to a normal state from the power down state, the required time for booting can be shortened compared with that from the full power off state as a result of the suspend-to-disk function, since the register values are directly restored from the main memory at the resumption of operation.

While the invention has been described in terms of an exemplary embodiment, it is contemplated that it may be practiced as outlined above with modifications within the spirit and scope of the appended claims.

What is claimed is:

1. A computer system provided with a power management system wherein contents of a main memory are maintained when the system proceeds to a rest mode of the power management system, the computer system comprising:

power supply means for converting power from one of alternating current and a battery into required system voltages;

microcontroller means for receiving a first operating voltage from the power supply means and for controlling power distribution based on a power management program stored in a BIOS ROM, and for generating a control signal when the system proceeds to the rest mode;

main memory means for receiving a second operating voltage from the power supply means and having a self-refresh function which operates in the rest mode;

memory controller means for receiving a third operating voltage from the power supply means and for generating memory control signals which are supplied to the main memory means; and buffer means for receiving the second operating voltage from the power supply means, said buffer means interrupting memory control signal lines and being inactivated in response to the control signal generated by the microcontroller means;

wherein the microcontroller means interrupts the third operating voltage when the buffer means is inactivated by the control signal from the microcontroller means.

2. The computer system of claim 1, wherein the main memory means comprises a DRAM, and the memory controller means is incorporated into a system controller of the computer system which receives the third operating voltage from the power supply means.

3. The computer system of claim 1, wherein the main memory means starts the self-refresh operation when a preset time has lapsed since final access thereto.

4. The computer system of claim 1, wherein said buffer means is embedded in said main memory means.

5. A method for controlling a power management system in which the contents of a main memory are maintained when the computer system proceeds to a rest mode, wherein the computer system includes a microcontroller for receiving a first operating voltage from a power supply and for controlling power distribution based on a power management program stored in a BIOS ROM, and for generating a control signal when the system proceeds to the rest mode, a main memory receiving a second operating voltage from the power supply and having a self-refresh mode, a memory controller receiving a third operating voltage from the power supply and generating memory control signals supplied to the main memory, and a buffer receiving the second operating voltage from the power supply for interrupting memory control signal lines in response to the control signal generated by the microcontroller; the method comprising the steps of:

determining whether the rest mode is initiated by detecting one of lapse of a preset time since the standby state, a battery level below a predetermined level, and actuation of a special function key that allows the system to enter into the rest mode;

storing values of registers of the computer into a main memory;

activating the main memory to operate in the self-refresh mode when it receives a CBR refresh signal and when a preset time has lapsed since final access thereto;

inactivating the buffer in response to the control signal generated by the microcontroller; and interrupting supply of the third operating voltage.

6. The method for controlling power management system of claim 5, wherein the step of activating the main memory to operate in the self-refresh mode comprise the steps of:

determining whether the main memory has received a CAS-before-RAS refresh signal from the memory controller;

determining whether a preset time has lapsed without an access to the memory since the reception of CAS-before-RAS refresh signal; and allowing the memory to enter into self-refresh operation if the preset time has lapsed.

7. A computer system having a power management system, comprising:

power supply means for generating first, second and third operating voltages;

microcontroller means for receiving the first operating voltage, for controlling power distribution in the system, and for generating a control signal when the system is in a rest mode;

memory means for receiving the second operating voltage and having a self-refresh function when the system is in the rest mode;

memory controller means for receiving the third operating voltage and for providing a memory control signal to the memory means; and buffer means disposed between the memory controller means and the memory means for interrupting the memory control signal and being inactivated in response to the control signal from the microcontroller means.

8. The system of claim 7, wherein the buffer means receives the second operating voltage.

9. The system of claim 7, wherein the microcontroller means interrupts the third operating voltage when the buffer means is inactivated by the control signal from the microcontroller means.

10. The system of claim 7, wherein the microcontroller means controls the power distribution based on a power management program stored in a read-only memory in the system.

11. The system of claim 10, wherein the read-only memory comprises a basic input-output system (BIOS) read-only memory (ROM).

12. The system of claim 7, wherein the power supply means converts one of alternating current and direct current from a battery into the first, second and third operating voltages.

13. The system of claim 7, further comprising an auxiliary storage device which receives the third operating voltage.

14. The system of claim 7, further comprising a central processing unit which receives the third operating voltage.

15. The system of claim 7, further comprising at least one input/output device which receives the third operating voltage.

16. A method for power management control of a computer system, comprising the steps of:

conducting a normal memory operation;

determining whether a rest mode of the system is initiated;

activating a memory of the system to operate in a self-refresh mode when a refresh signal is received and after lapse of a preset time since a final access thereto; and deactivating the memory and entering a power-down mode in response to a control signal from a microcontroller of the computer system;

wherein the deactivating step comprises inactivating all memory pins.

17. The method of claim 16, wherein the activating step comprises:

determining whether the main memory has received a CAS-before-RAS refresh signal from a memory controller;

determining whether a preset time has lapsed without an access to the memory since the reception of CAS-before-RAS refresh signal; and allowing the memory to enter into the self-refresh mode if the preset time has lapsed.

18. The method of claim 16, further comprising the steps of:

determining whether a power down pin is high; and resuming normal memory operation when the power down pin is high.

19. A method for power management control of a computer system, comprising the steps of:

conducting a normal memory operation;

determining whether a rest mode of the system is initiated;

activating a memory of the system to operate in a self-refresh mode when a refresh signal is received and after lapse of a preset time since a final access thereto; and deactivating the memory and entering a power-down mode in response to a control signal from a microcontroller of the computer system;

said method further comprising the step of storing values of registers of the computer system into the memory.

* * * * *